July 22, 1958     T. R. THOMSEN     2,844,784
CURRENT COMPENSATOR CONTROL FOR WELDING CIRCUIT
Filed July 15, 1953     3 Sheets-Sheet 1
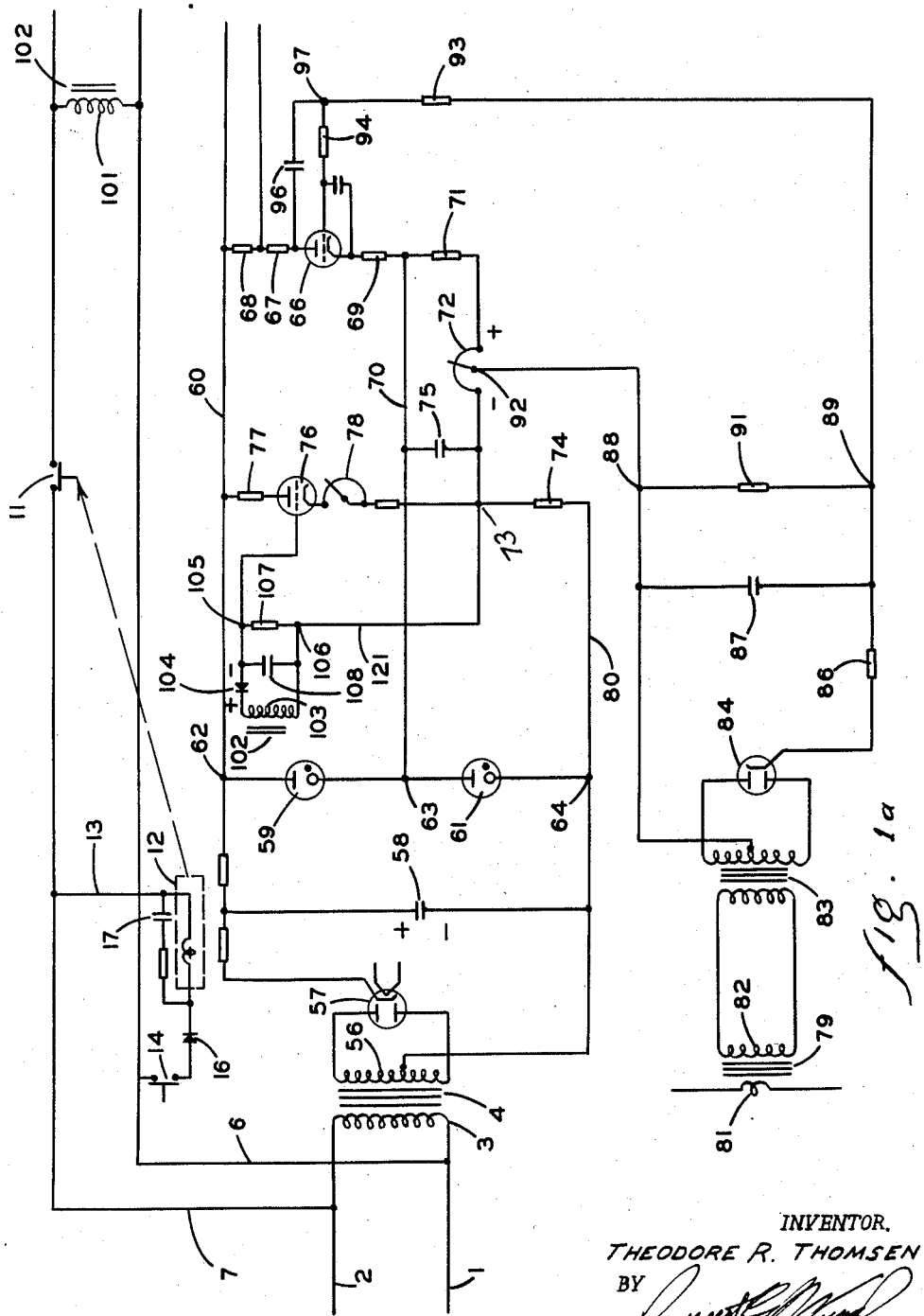
fig. 1a
INVENTOR.
THEODORE R. THOMSEN
BY
ATTORNEY July 22, 1958     T. R. THOMSEN     2,844,784
CURRENT COMPENSATOR CONTROL FOR WELDING CIRCUIT
Filed July 15, 1953     3 Sheets-Sheet 2

INVENTOR.
THEODORE R. THOMSEN
BY
ATTORNEY

July 22, 1958 T. R. THOMSEN 2,844,784
CURRENT COMPENSATOR CONTROL FOR WELDING CIRCUIT
Filed July 15, 1953 3 Sheets-Sheet 3
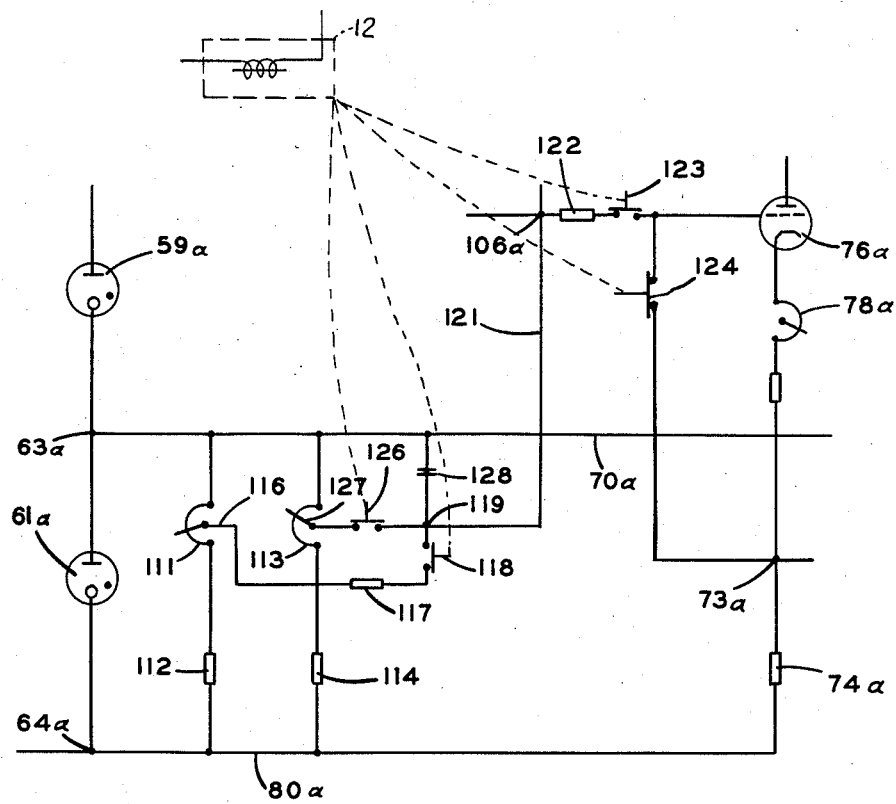
fig. 2
INVENTOR.
THEODORE R. THOMSEN
BY
ATTORNEY

United States Patent Office 2,844,784
Patented July 22, 1958

2,844,784
CURRENT COMPENSATOR CONTROL FOR WELDING CIRCUIT

Theodore R. Thomsen, Farmington, Mich., assignor to Robotron Corporation

Application July 15, 1953, Serial No. 368,153

18 Claims. (Cl. 323—18)

This invention relates to a current compensating control for a resistance welding circuit and more particularly to a control adapted to compensate for the losses incurred in the welding transformer when extra inductance is added by an increase of metal in the throat of the welding machine. The invention further relates to a circuit providing a supply of current to welding electrodes which will follow a predetermined pattern of current magnitude regardless of inductance, or similar, changes occurring in the circuit during the period of flow of such current.

During the process of conventional resistance welding, such as making a series of spot welds or a seam weld, it often happens that progressively more of the work piece is caused to become positioned between the arms on which the welding electrodes are fixed and this increases the inductance in the secondary circuit of the welding transformer. This results in less current flowing through the welding electrodes which in turn results in less heat and, if not properly compensated, may result in an inferior weld. In ordinary welding practice, it is satisfactory if the heat is held at a level that does not drop below 80% of the starting level. In order to compensate for the decreased current, the effective voltage applied to the primary circuit of the welding transformer can be raised and, if the primary voltage is properly controlled, the current through the secondary will then remain at a constant level and will cause a constant value of welding heat.

This problem has been recognized by the welding industry for a long time and a variety of devices have been proposed for solving it. However, insofar as I am aware, the devices thus far offered have been either undesirably complex or they have not been sufficiently accurate to provide the desired degree of control.

A further and particularly difficult problem arises where it is necessary to supply an increasing or a decreasing current to a pair of welding electrodes and at the same time provide current regulation as above set forth. A particular example occurs in the can welding industry wherein, as a welding operation progresses, the work metal through which current may pass constantly increases in cross-sectional area and hence the current applied to the work in sufficient intensity to heat same progressively diminishes. In the past, the only remedy for this situation has been to set the welding heat at such a point that the current would start at a value a little above the optimum value and finish at a point a little below the optimum value so that as great a proportion as possible of the weld was reasonably close to the optimum value, and the beginning and end points were not so far therefrom as to prevent the making of at least a commercially acceptable weld. It was therefore desired in these instances to provide a current regulating device which will supply a progressively increasing amount of current to the welding electrodes at a precisely predeterminable rate and yet to maintain full current regulating control to compensate for variations in inductance in the secondary circuit of the welding transformer as above set forth. Inasmuch as the basic concept of current regulation is in exact opposition to the concept of increasing or decreasing the current supplied to welding work, it has always been supposed that such a combination of current control features is impossible and, insofar as I am aware, it has never been successfully attempted.

It is therefore a principal object of the invention to provide a device for use with resistance welding apparatus by which increased inductance in the circuit of the secondary winding of the welding transformer will automatically result in an increased voltage in the primary winding of the welding transformer which increase voltage will be in such magnitude as to maintain the welding current at a substantially constant level.

A further object of the invention has been to provide apparatus, as aforesaid, which will react rapidly and accurately to changes in the inductance introduced into said secondary circuit.

It is a further object of the invention to provide apparatus which will supply a current at a predeterminedly increasing or decreasing rate of change of magnitude and yet maintain the regulatory features set forth in the two preceding paragraphs.

A further object of the invention has been to provide apparatus, as aforesaid, which will be relatively simple.

A further object of the invention has been to provide apparatus, as aforesaid, which will be relatively sturdy and not readily subject to breakdown.

A further object of the invention has been to provide apparatus, as aforesaid, which will reach a new stability level within three or four cycles following the change in inductance.

A further object of the invention has been to provide apparatus, as aforesaid, which will not hunt following a change in inductance.

A further object of the invention has been to provide apparatus, as aforesaid, which will be highly flexible and which can be readily adapted to a variety of different specific requirements.

Other objects and purposes of the invention will be apparent to persons acquainted with apparatus of this general type upon reading the following specification and inspection of the accompanying drawings.

In the drawings:

Figure 1, in parts "a" and "b" thereof, represents a circuit diagram of a preferred form of the invention.

Figure 2 represents a circuit diagram of a modification of the invention wherein the functions of progressively increasing or decreasing the value of the welding current can be carried out in a predetermined manner.

In general

In general, I have provided a phase shift control for a welding circuit and I have provided a circuit subjected both to minimum activation and to activation by feedback from the welding current to determine the degree of phase shift applied. This circuit is kept in a condition of minimum activation during "off" periods of the welding cycle and is then subjected substantially entirely to the feed-back control circuit during the "on" period of the welding cycle. A reference potential is provided at a constant value with respect to which the rest of the circuit operates and with respect to which conditions in the rest of the circuit are caused to vary to maintain constant current value in spite of changes in inductance. In the form of the circuit causing said current to change according to a predetermined pattern regardless of changes in inductance within the circuit, means are provided by which the reference voltage is altered at a predetermined rate and the balance of the circuit then functions to hold the current supplied to the welding electrodes in a predetermined relationship to said reference potential.

Detailed description

Figure 1B:
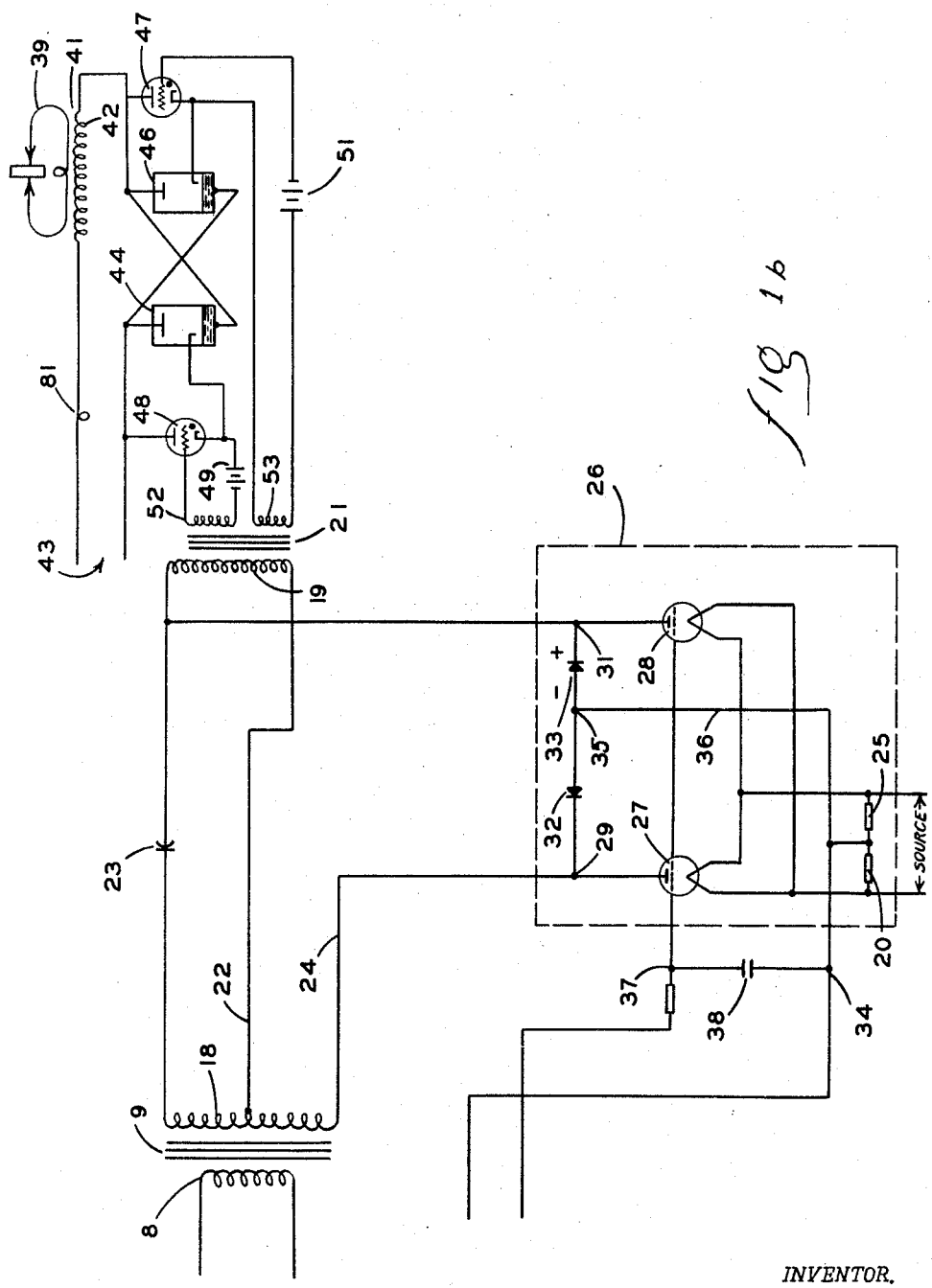

For convenience in description, and without intending to limit the use or applicability of my invention in any way, the description will proceed first in terms of the supplying of a welding current at a constant value and the simplified circuit effecting this purpose is illustrated in Figures 1a and 1b.

Beginning with reference to Figure 1a, an alternating potential is supplied from any convenient source through the conductors 1 and 2 to the primary winding 3 of a transformer 4. Conductors 6 and 7, for energizing the firing tubes hereinafter mentioned, lead from the conductors 1 and 2 respectively to the primary winding of the transformer 9 and the normally open contacts 11 of the relay 12 are interposed in series into said circuit. The winding of said relay is energized through the conductor 13 upon closing of the initiation switch 14. The rectifier 16 is provided for causing the relay to close in response to a pulse in only one selected direction. The capacitor 17 is provided to hold the winding energized for long enough to activate the firing circuit even if the initiation switch remains closed only momentarily. It will be appreciated that said initiation switch may be of any conventional type and may represent another electronic circuit adapted for initiating and terminating the flow of welding current.

The secondary winding 18 of the transformer 9 is connected through a phase shifted circuit of a type set forth in detail in the application of Stuart C. Rockafellow, Serial No. 210,922, now abandoned. Briefly, said phase shift circuit comprises the primary winding 19 of a transformer 21, which winding is connected at one end 22 to a point between the ends of said secondary winding 18 and connected at its other end through a capacitor 23 to one end of the secondary winding 18. The other end of said secondary winding 18 is connected by a conductor 24 through a resistance circuit 26 to a point between the capacitor 23 and winding 19. Said resistance circuit 26 is described in detail in the application of Stuart C. Rockafellow, Serial No. 214,093, now Patent No. 2,691,745 but, briefly, comprises a pair of vacuum tubes 27 and 28 whose anodes are connected to the terminal points 29 and 31 respectively of said resistance circuit 26. Said terminal points are directly connected through rectifiers 32 and 33 which are placed in opposite polarity with respect to each other. The cathodes of the vacuum tubes are connected to each other and to one terminal 34 of the controlling circuit. The cathodes are also connected by a conductor 36 through resistances 20 and 25 to a point 35 intermediate the two rectifiers. The grids of the vacuum tubes are connected to each other and to the other terminal 37 of the controlling circuit. The terminals 34 and 37 are connected to each other through a capacitor 38.

The secondary circuit 39 of the welding transformer 41 is connected to welding electrodes in the usual manner. The primary winding 42 of said welding transformer is connected to a convenient source of alternating potential 43 in any conventional manner through a pair of back-to-back connected ignitrons 44 and 46 which are controlled by a pair of thyratron firing tubes 47 and 48. These firing tubes are normally biased into non-conductive condition by D. C. sources 49 and 51. Said D. C. sources are overcome and said tubes caused to conduct by the secondary windings 52 and 53 of the firing transformer 21 in a manner which is already well known and will be readily understood.

It will be recognized that phase shifting of the energization of said secondary windings 52 and 53 with respect to the energization of the secondary winding 39 will result in varying the heat applied to the welding electrodes, also in a manner which is well understood in the art. Further, as set forth in detail in said Rockafellow application Serial No. 214,093, varying the potential between the grid and cathodes of the vacuum tubes 27 and 28 will act in the manner of a varying resistance and will effect a phase shift of the primary transformer winding 19 with respect to the phase applied to the primary winding of the transformer 9, which phase shift will be proportional to the magnitude of potential so applied.

Returning now to the transformer 4, a secondary winding 56 thereof acts through the rectifier 57 and through the circuit including the capacitor 58 and the two voltage regulator tubes 59 and 61 to provide substantially constant potentials at the terminal points 62, 63 and 64. The connections are such that point 62 is positive with respect to point 63 and point 63 is positive with respect to point 64.

The vacuum control tube 66, which may be a 6SN7 tube or, where more sensitivity is desired, it may be a 6SL7 tube, is connected by its anode through a protective resistance 67 and a further series connected resistance 68 to the conductor 60 and thence to the terminal point 62. The cathode of said last named tube is connected through a small safety resistor 69 and thence by the conductor 70 to the terminal point 63. Said cathode is also connected through the resistance 71 and the potentiometer 72 to the junction point 73 and thence through the resistance 74 to the terminal point 64. A timing capacitor 75 connects the junction point 73 with the conductor 70.

A further vacuum tube 76 is connected by its anode through a resistance 77 to the conductor 60 and thence to the terminal 62. Said vacuum tube is also connected by its cathode through a potentiometer 78 to the junction point 73.

A current transformer 79 is connected by its primary winding 81 in the circuit of the primary winding of the welding transformer 41 and has its secondary winding 82 connected to the primary winding of a transformer 83. The secondary winding of said transformer 83 is connected through a rectifier 84, a resistance 86, and a capacitor 87 in a conventional manner for providing a rectifier circuit to provide D. C. voltage of substantially constant character at the terminal points 88 and 89. Said terminal points are connected through a resistor 91. The terminal point 88 is connected to the slider 92 of the potentiometer 72 and the terminal point 89 is connected through a resistor 93 and another relatively large resistor 94 to the grid of the vacuum tube 66. A capacitor connects the anode of said vacuum tube 66 with a point 97 located between the resistors 93 and 94 for purposes appearing hereinafter. The primary winding 101 of a transformer 102 is connected in parallel with the primary winding 8 of the transformer 9 and the secondary winding 103 thereof is connected through a rectifier 104 to the terminal points 105 and 106 respectively. The said terminal points are connected by a resistance 107 to provide a voltage drop therebetween and said resistance is shunted by a capictor 108. The terminal point 105 is connected to the grid of the vacuum tube 76 and the terminal point 106 is connected to the junction point 73.

Turning now to the somewhat more complex circuit effective for providing the functions described above together with the additional functions of supplying a welding current at a predeterminedly increasing rate or predeterminedly decreasing rate regardless of changes in inductance within the circuit, attention is now directed to Figure 2. This circuit is the same as that above described for Figure 1 except the portion particularly indicated in Figure 2, the numerals corresponding to numerals used in Figure 1 being the same numerals with the addition of the letter "a." Here, however, there is also provided a potentiometer 111 and a resistance 112 connected in series with each other and connecting the conductor 70a with the conductor 80a. A further potentiometer 113 and resistance 114 are connected in series with each other and also connect the conductors 70a and 80a. A conductor from the slider 116 of the potentiometer 111 is connected through the resistance 117 and through the normally open contacts 118 of the relay 12 to the junction point 119. The junction point 119 is then connected by conductor 121 to terminal points 106a, thence through a resistance 122 and the normally open contacts 123 of the relay 12 to the grid of the tube 76a. The grid of said tube 76a is also connected through the normally closed contacts 124 of the relay 12 to the junction point 73a. The junction point 119 is also connected through the normally closed contacts 126 of the relay 12 to the slider 127 of the potentiometer 113. Said junction point 119 is also connected through a capacitor 128 to the conductor 70a.

Operation

Inasmuch as the circuit including the supply conductors 1 and 2, the transformer 9, the transformer 21, the ignitrons 44 and 46 and the resistance circuit 26 are all well known, or have been previously explained in detail elsewhere as above indicated, detailed explanation of their mode of operation is not necessary here excepting only to point out that change in the potential difference between the terminal points 34 and 37 will effect a shift in the phase of alternating pulses appearing in the primary winding 19 as compared to the phase of alternating pulses appearing in the primary winding 8 and will thereby effect a change in the magnitude of heat applied to the welding electrodes. A decrease in phase shift will increase the welding heat and vice versa.

Inasmuch as the potential difference between terminal points 34 and 37 will depend upon the voltage drop across the resistance 68, it follows that said potential difference will be determined by the amount of resistance interposed between the conductor 70 and the conductor 60 by the tube 66 and this in turn will be a function of the potential difference between the grid of said tube and its cathode.

Therefore, considering first the "at rest" condition of the apparatus and referring to Figures 1a and 1b, the following will exist: with the rectifier circuit including the secondary winding 56, the tube 57, the voltage regulator tubes 59 and 61 functioning in response to potential applied to the conductors 1 and 2, there will be provided D. C. potentials at the terminal points 62, 63 and 64 wherein the potential of point 62 is positive with respect to the potential of point 63 and the potential of point 63 is positive with respect to the potential of point 64. Inasmuch as the contacts 11 of the relay 12 are open, the transformer 102 will be de-energized and the grid of the tube 76 will be connected through the resistance 107 and the potentiometer 78 to the cathode thereof and hence said tube will be conductive. The magnitude of conduction through said tube will be dependent upon the setting of the potentiometer 78. The setting of the potentiometer 78 will also determine the potential difference between the junction point 73 and the conductor 70 and thereby determine the potential level of the negative end of the potentiometer 72.

A potential originating at the terminal points 62 and 63 is also placed across the principal electrodes of the tube 66 and its conductivity will be determined by the potential placed on the grid thereof. Inasmuch as the terminal point 73 is negative with respect to the conductor 70, it follows that the slider of the potentiometer 72 will also be negative with respect to the conductor 70 to a degree dependent upon the position of said slider. Since the said slider 92 is connected through the resistance 91 and through the resistances 93 and 94 to the grid of the tube 66, it is apparent that said grid will be negative with respect to the cathode of said tube by an amount dependent in part upon the adjustment of the slider of the potentiometer 72 and in part upon the adjustment of the slider of the potentiometer 78. The presence of the resistance 71 insures that there will always be a potential difference between the conductor 70 and the slider of the potentiometer 72 and hence, regardless of the position of said potentiometer, there will always be a potential difference between the grid and cathode of the tube 66 for purposes appearing hereinafter.

Thus, a determinable amount of bias is held on the tube 66 so that during the "off" period of the welding cycle the potential difference between the terminal points 34 and 37 is at somewhat less than the maximum and this results in a low limit being placed upon the amount of phase shift effected during said "off" periods.

With the commencement of a weld heat period, initiated by the closing of the switch 14, the relay 12 is activated and its contacts 11 are closed whereby the transformer 9 is energized resulting in the energization of the phase shift circuit including the resistance section 26 and this in turn results in the energization of the transformer 21. As above indicated, energization of said transformer 21 will act through the secondary windings thereof 52 and 53 to fire the firing thyratrons 47 and 48 and in a known manner effect conduction of the ignitrons 44 and 46 and thereby effect the passage of welding current through the welding electrodes. The passage of such welding current through the primary winding of the welding transformer energizes the transformer 79 and through it the transformer 83. This acts through the rectifier circuit connected to the secondary winding of the transformer 83 and places a D. C. potential at the terminal points 88 and 89. Simultaneously, the energization of the conductors 6 and 7 energizes the transformer 102 and places a unidirectional potential at the terminal points 105 and 106. This places a blocking potential on the grid of the tube 76 and forthwith terminates its conduction. In the first instance, this tends to make the terminal point 73 more negative and thereby drive in a negative direction the potential of the grid of the tube 66. However, the polarity of the potentials placed upon the terminal points 88 and 89 by the rectifier circuit including the secondary winding of the transformer 83 tends to place a positive potential onto the grid of the tube 66. The magnitude of such positive potential is proportional to the magnitude of welding current flowing through the primary circuit of the welding transformer.

When the welding current decreases due to increase in inductance between the welding electrodes, the current flowing between the points 88 and 89 will diminish and thereby diminish the voltage drop across the resistance 91. This will diminish the potential at the points 88 and 89 and thereby diminish the amount of positive potential placed upon the grid of the tube 66. Thus, the negative potential originating in the conductor 80 will become more effective and increase the amount of resistance effective through the said tube 66. This will diminish the potential drop across the resistance 68 and thereby diminish the potential difference between the terminal points 34 and 37. Such decrease in potential between these terminal points will increase the current flowing through the vacuum tubes 27 and 28 and decrease the amount of phase shift. This will increase the flow of current through the welding circuit sufficiently to compensate for the decrease initially effected by the increased inductance.

By having the tube 66 always conducting in at least a small degree, there is sufficient preconditioning of the resistance circuit 26 to enable a stability level of the modified welding heat to be attained within about 3 cycles of operation. Without such preconditioning, it might require at least 10 cycles to obtain such stability level and this period of time is in many instances longer than the weld time itself.

The capacitor 75 placed between the conductor 70 and the terminal point 73 slows the variation in potential between said conductor 70 and the slider 92 of the potentiometer 72 sufficiently that there is no overcompensating which would result in "hunting" for, possibly as many as six cycles. By the use of such capacitor, the compensation in welding heat is smooth and even and hunting is substantially eliminated.

Inasmuch as capacitor 75 will discharge through the regulator tube 61 between pulses of welding current, the beginning of each pulse permits heat to start from the same point as in the previous pulse. Otherwise, there would in many instances be a charge remaining on capacitor 75 and this would effect the potential on the grid of the tube 66 and thereby affect the phase shift sufficiently to materially affect the heat applied to the next welding period.

Inasmuch as the potential across the resistance 91 is a rectified D. C. potential it will have in it an appreciable amount of the ripple which is customarily present in such D. C. potentials. Since this, if permitted to exist, may vary the sensitivity of tube 66 and thereby place a corresponding ripple in the weld heat, it is desirable to reduce such ripple to a minimum value. Increasing the value of the capacitor 87 sufficiently to diminish this ripple to a desirably low level would so slow the attainment of suitable stabilization that such is unsatisfactory. However, it has been found that the presence of the capacitor 96 reduces such ripple to a negligible value without unduly slowing the response of the circuit to a change in inductance within the throat of the welding machine.

In the apparatus shown in Figure 2 the "at rest" condition is substantially similar to that above described for the circuit shown in Figure 1 and the tube 76a is similarly conductive by the connection of its grid through the normally closed contacts 124 to the junction point 73a. The capacitor 128 is connected through normally closed contacts 126 to the potentiometer 113 between the conductor 70a and the conductor 80a, and is charged to a value determined by the setting of the potentiometer 113.

Upon the commencement of a welding cycle the contacts 124 and 126 open and the contacts 123 and 118 close.

This connects the grid of the tube 76a to the negative end of capacitor 128, the potential of capacitor 128 being determined by adjustment of the slider 127 of potentiometer 113. The grid of tube 76a is thus made negative to the cathode with closure of the contacts 123 and 118, and the conduction of the tube is decreased.

Closure of contact 118 and opening of contact 126 allows capacitor 128 to charge further to a potential determined by the position of slider 116 on potentiometer 111, which potential is that between slider 116 and conductor 70a. The rate of charge is determined by resistor 117. Thus, the conduction of tube 76a is further decreased at a predetermined rate until capacitor 128 is charged to the level determined by potentiometer 111 adjustment.

The reference potential appearing between slider 92 of potentiometer 72 and conductor 70 is in this manner caused to increase abruptly with closure of contacts 123 and 118 and opening of contacts 124 and 126, then rising still further at a rate determined by the resistance of resistor 117 and the capacitance of capacitor 128 with the result that the weld current is started at a low value and allowed to increase for a specific time to a predetermined high value. The value of weld current is of exactly predetermined value at any specific time in the weld cycle regardless of line fluctuations or welder throat inductance.

It will be recognized in view of the foregoing description that the setting of the potentiometers 111 and 113 will determine the manner in which the capacitor 128 changes potential from the "at rest" condition to the "operating" condition. Where the setting of such potentiometers is such that opening of the contacts 126 and closing of the contacts 118 will make the point 119 more negative with respect to the cathode of the tube 76a, the conductivity of said tube will progressively diminish and the current supplied to the welding electrode will progressively increase as above set forth. By setting the said potentiometers to such adjustments that closing of the contact 118 and opening of the contact 126 will not change the potential of the point 119 with respect to the cathode of the tube 76a, the conductivity of said tube will remain constant and the apparatus will supply welding current of constant value to the welding electrodes. Further adjustment of the potentiometers 111 and 113 will permit a decrease in potential of the point 119 upon closing of the contacts 118 and opening of the contacts 126 as the charge on the capacitor 128 drains out through the contact 118 and the connected portion of the potentiometer 111. Such decrease of the potential of the capacitor 128 will permit an increase in the conductivity of the tube 76a and thus effect a correspondingly progressive decrease in the value of the current supplied to the welding electrodes. This will permit a predeterminedly increasing current applied to the welding electrode regardless of changes in inductance in the circuit.

This connects the grid of the tube 76a through the potentiometer 111 to the conductor 80a. However, the effect of such conduction is at first minimized by the opening of the contacts 126 and the placing of the charge of the capacitor 128 between the conductor 70a and the grid of the tube 76a. As such charge drains off through the potentiometer 111 to the conductor 80a, the grid of said tube 76a becomes progressively more negative and presently said tube is entirely blocked. The remainder of the operation of the circuit shown in Figure 2 is the same as that described above for the circuit shown in Figure 1.

Accordingly, I have set forth apparatus by which the objects and purposes above set forth may be accomplished.

Whereas I have illustrated my invention by two particular embodiments of apparatus for carrying out said invention, it should be understood that the particular embodiments here shown are for illustrative purposes only and that said embodiments may be varied in a variety of ways and they will still be within the scope of the hereinafter appended claims excepting as said claims may by their own terms expressly require otherwise.

I claim:

1. In apparatus automatically responding to changes in magnitude of welding current and adjusting same to maintain welding heat at a constant value, the combination comprising: a pair of terminal points; means including an adjustable phase shift circuit for controlling heat, the adjustment thereof responding to variations in potential difference between said pair of terminal points; means including a pair of resistances in series and responsive to the magnitude of current flowing through the primary winding of the welding transformer; and feed back means for adjusting the value of one of said resistances and thereby adjusting said potential difference; means further modifying the value of said one resistance for modifying said potential difference in a limited heat raising direction during heat off periods in the welding cycle and other means superseding said last-named means during heat on periods of said cycle.

2. The device defined in claim 1 wherein said one of said resistances is an electric discharge device having a control electrode and whose net effective internal resistance is variable in response to the charge on said control electrode and means connecting both of said feed back means and said last named other means to said control electrode for controlling said welding heat.

3. In apparatus automatically responding to changes in magnitude of welding current and adjusting same to maintain welding heat at a predetermined value, the combination comprising: means including an adjustable phase shift circuit for controlling welding heat, the adjustment thereof responding to variations in potential difference between a pair of terminal points; means providing a pair of constant voltage points; a first resistance and means connecting same to said pair of terminal points; a second resistance and conductors connecting said first and second resistances in series with respect to each other and in series between said constant voltage points, said second resistance being variable in response to the potential applied between a control terminal and a principal terminal thereof; feed back means responsive to the flow of welding current for controlling said last named potential, thereby determining the potential drop across said first resistance and thereby in turn determining the magnitude of phase shift; a third resistance; a second constant voltage source having one terminal connected to a terminal of opposite polarity of a first constant voltage source and its other terminal connected through said third resistance to said control terminal; a relief circuit shunting said first and second resistances and connected through said third resistance to said control terminal; an externally controlled switch and means responsive to said switch for determining the conductivity of said relief circuit; a firing circuit for said welding circuit and means connecting said firing circuit and said relief circuit such that said relief circuit is rendered highly conductive when potential is withdrawn from said firing circuit and said relief circuit is of lessened conductivity when potential is applied to said firing circuit, whereby during "heat off" periods of a welding sequence said relief circuit is highly conductive and the negative bias applied to said control terminal is at a predetermined level and during "heat on" periods of a welding sequence the conductivity of the relief circuit is at a low level and the negative bias applied to the control terminal is at a higher level, but subject to modification by said feed back means.

4. In apparatus for automatically controlling the magnitude of a welding current and adjusting same to maintain welding heat at a predetermined value, the combination comprising: means including an adjustable phase shift circuit for controlling welding heat, the adjustment thereof being responsive to variations in potential difference between a pair of terminal points; first and second constant voltage terminals and means imposing a constant voltage therebetween; a first resistance and means connecting same to said terminal points; a second resistance and means connecting same in series with said first resistance and other means connecting said first and second resistances in series between said first and second constant voltage terminals, said second resistance being variable in effective resistivity according to the potential difference existing between a control terminal thereof and the second of said constant voltage terminals; means normally applying a potential difference between said second constant voltage terminal and said control terminal and feed back means responsive to the magnitude of welding current during "heat on" periods for modifying said last-mentioned potential difference; a relief circuit for reducing said potential difference between said terminal points to a relatively low, selected, level during "heat off" periods; whereby said phase shift circuit will be pre-set to a condition corresponding to a relatively high welding heat immediately prior to a "heat on" period.

5. The device defined in claim 4 wherein said second resistance is a vacuum tube and the control terminal is the grid thereof.

6. The device defined in claim 5 having a capacitor connected between the grid and the anode of said vacuum tube.

7. The device defined in claim 5 having a capacitor connected between the cathode and the grid of said vacuum tube for slowing the response to potential changes therebetween and thereby preventing overcontrol thereof.

8. The device defined in claim 4 wherein said relief circuit includes a vacuum tube.

9. The device defined in claim 4 wherein said relief circuit includes a vacuum tube and includes further means for progressively changing the value of the resistance offered by said vacuum tube at the beginning of a "heat on" period whereby the phase shift effected by said circuitry and the heat thereby supplied by the welding circuit may be caused to conform to a preselected pattern.

10. In apparatus for automatically controlling the magnitude of a welding current and adjusting same to maintain welding heat at a predetermined value, the combination comprising: means including an adjustable phase shift circuit for controlling welding heat, the adjustment thereof responsive to variations in potential difference between a pair of terminal points; first and second constant voltage terminals and means imposing a constant voltage therebetween; a first resistance and means connecting same to said terminal points; a second resistance and means connecting same in series with said first resistance and other means connecting said first and second resistances in series between said first and second constant voltage terminals, said second resistance being variable in effective resistivity according to the potential difference existing between a control terminal thereof and the second of said constant voltage terminals; means normally applying a potential difference between said second constant voltage terminal and said control terminal and feed back means responsive to the magnitude of welding current during "heat on" periods for modifying said last-mentioned potential difference.

11. In apparatus automatically responding to changes in magnitude of welding current and adjusting same to maintain welding heat at a constant value, the combination comprising: a pair of terminal points; means including an adjustable phase shift circuit for controlling heat, the adjustment thereof responding to variations in potential difference between said pair of terminal points; a first resistance and means connecting each side of said first resistance respectively to each of said terminal points; a second and adjustable resistance in series with said first resistance; a source of constant potential and said first and second resistances being connected in series circuit to each side of said source of constant potential; means responsive to the magnitude of current flowing through the welding circuit for varying the value of said second resistance; a second source of constant potential and means responsive thereto during heat off periods of the welding cycle for holding the value of said second resistance at a relatively low level but higher than the minimum value of said resistance otherwise attainable; other means energized during heat on periods of the welding cycle for superseding the effect of said last named means, and a capacitor connected for opposing the changing of the value of said second resistance in response to changes in magnitude of current flowing through the welding circuit.

12. In apparatus automatically responding to changes in magnitude of welding current and adjusting same to maintain welding heat at a constant value, the combination comprising: means including an adjustable phase shift circuit for controlling heat, the adjustment thereof responding to variations in potential difference between a pair of terminal points; a first resistance and means connecting each side of said first resistance respectively to each of said terminal points; a source of constant potential; an electric discharge vacuum device in series with said resistance and comprising a second resistance, said first and second resistances being connected in series circuit to each side of said source of constant potential; means responsive to the magnitude of current flowing through the welding circuit for varying the potential on the grid of said electric discharge device with respect to its cathode for varying the value of said second resistance; a second source of constant potential and means responsive thereto during heat off periods of the welding cycle for holding the value of said second resistance at a relatively low level; other means energized during heat on periods of the welding cycle for modifying the effect of said last-named means, and a capacitor connected for opposing the changing of the value of said second resistance in response to changes in magnitude of current flowing through the welding circuit.

13. Apparatus as described in claim 12 including also a capacitance connected between the grid and anode of said electric discharge device.

14. In apparatus automatically responding to changes in magnitude of welding current and adjusting same to maintain welding heat at a constant value, the combination comprising: means including an adjustable phase shift circuit for controlling heat, the adjustment thereof responding to variations in potential difference between a pair of terminal points; a first resistance and means connecting each side of said first resistance respectively to each of said terminal points; an electric discharge vacuum device comprising a second resistance and being in series with said first resistance; independent sources of potential providing first, second and third potential sources at first, second and third potential levels, the first thereof being positive with respect to the second and the second thereof being positive with respect to the third, said first and second resistances being connected in series between said first and second potential level sources and the cathode and grid of said electric discharge device being connected respectively to the second and third of said potential level sources, the connection of said grid to said third potential level source including a third resistance and a potentiometer; a capacitor connected between said second potential level source and the third potential level source; means responsive to current flowing in the primary winding of the welding transformer for imposing a potential difference across said third resistance of value dependent upon the value of said current.

15. In apparatus automatically responding to changes in magnitude of welding current and adjusting same to maintain welding heat at a constant value, the combination comprising: means including an adjustable phase shift circuit for controlling heat, the adjustment thereof responding to variations in potential difference between a pair of terminal points; a first resistance and means connecting each side of said first resistance respectively to each of said terminal points; a first electric discharge vacuum device in series with said first resistance; independent sources of potential providing first, second and third potential sources at first, second and third potential levels, the first thereof being positive with respect to the second and the second thereof being positive with respect to the third, said first resistance and said first electric discharge vacuum device being connected in series between said first and second potential level sources and the cathode and grid of said first electric discharge device being connected respectively to the second and third of said potential level sources, the connection of said grid to said third potential level source including a second resistance and a potentiometer; a capacitor connected between said second potential level source and the third potential level source; a second electric discharge device connected between the first potential level source and the third potential level source and including a potentiometer in the cathode circuit thereof; means connecting the grid of said second electric discharge device to the third potential level source and other means imposing a blocking potential onto said grid of said second electric discharge device upon energization of said phase shift circuit; means responsive to current flowing in the primary winding of the welding transformer for imposing a potential difference across said second resistance of value dependent upon the value of said current.

16. An apparatus defined in claim 15, including: a second capacitor; a plurality of charging circuits between said second and third potential level sources, selectively and alternately connectible to said second capacitor for charging said second capacitor; resistance means in each of said charging circuits for controlling the rate of charge of said second capacitor by the respective charging circuits; and means connecting the negative side of said second capacitor to the grid of said second electric discharge device.

17. In apparatus automatically responding to changes in magnitude of welding current and adjusting same to maintain welding heat at a constant value, the combination comprising: means including an adjustable phase shift circuit for controlling heat, the adjustment thereof responding to variations in potential difference between a pair of terminal points; a first resistance and means connecting each side of said first resistance respectively to each of said terminal points; a first electric discharge vacuum device in series as a second resistance with said first resistance; independent sources of potential providing first, second and third potential sources at first, second and third potential levels, the first thereof being positive with respect to the second and the second thereof being positive with respect to the third, said first and second resistances being connected in series between said first and second potential level sources and the cathode and grid of said first electric discharge device being connected respectively to the second and third of said potential level sources, the connection of said grid to said third potential level source including a third resistance and a potentiometer; a capacitor connected between said second potential level source and the third potential level source; a second electric discharge device connected between the first potential level source and the third potential level source and including a potentiometer in the cathode circuit thereof; means connecting the grid of said second electric discharge device to the third potential level source during one condition of the apparatus and other means opening said last-named connection and including time constant means for imposing a potential of predeterminedly varying characteristics onto the grid of said second electric discharge device during another condition of the apparatus.

18. In apparatus automatically responding to changes in magnitude of welding current and adjusting same to maintain welding heat at a constant value, the combination comprising: a pair of terminal points; means, including an adjustable phase shift circuit, for controlling welding heat, the adjustment thereof responding to variations in potential difference between said pair of terminal points; means, including a pair of resistances in series, responsive to the magnitude of current flowing through the welding circuit for applying a potential difference between said terminal points; feed back means for adjusting the value of one of said resistances and thereby adjusting said potential difference; means further modifying the value of said one resistance for modifying said potential difference in a limited heat raising direction during "heat-off" periods in the welding cycle and other means superseding said last-mentioned means during "heat-on" periods of said cycle.

References Cited in the file of this patent

UNITED STATES PATENTS

| | | |
|---|---|---|
| 2,429,186 | Johnson et al. | Oct. 14, 1947 |
| 2,431,248 | Hartwig | Nov. 18, 1947 |
| 2,458,644 | Ringer et al. | Jan. 11, 1949 |